United States Patent Office 3,323,220
Patented June 6, 1967

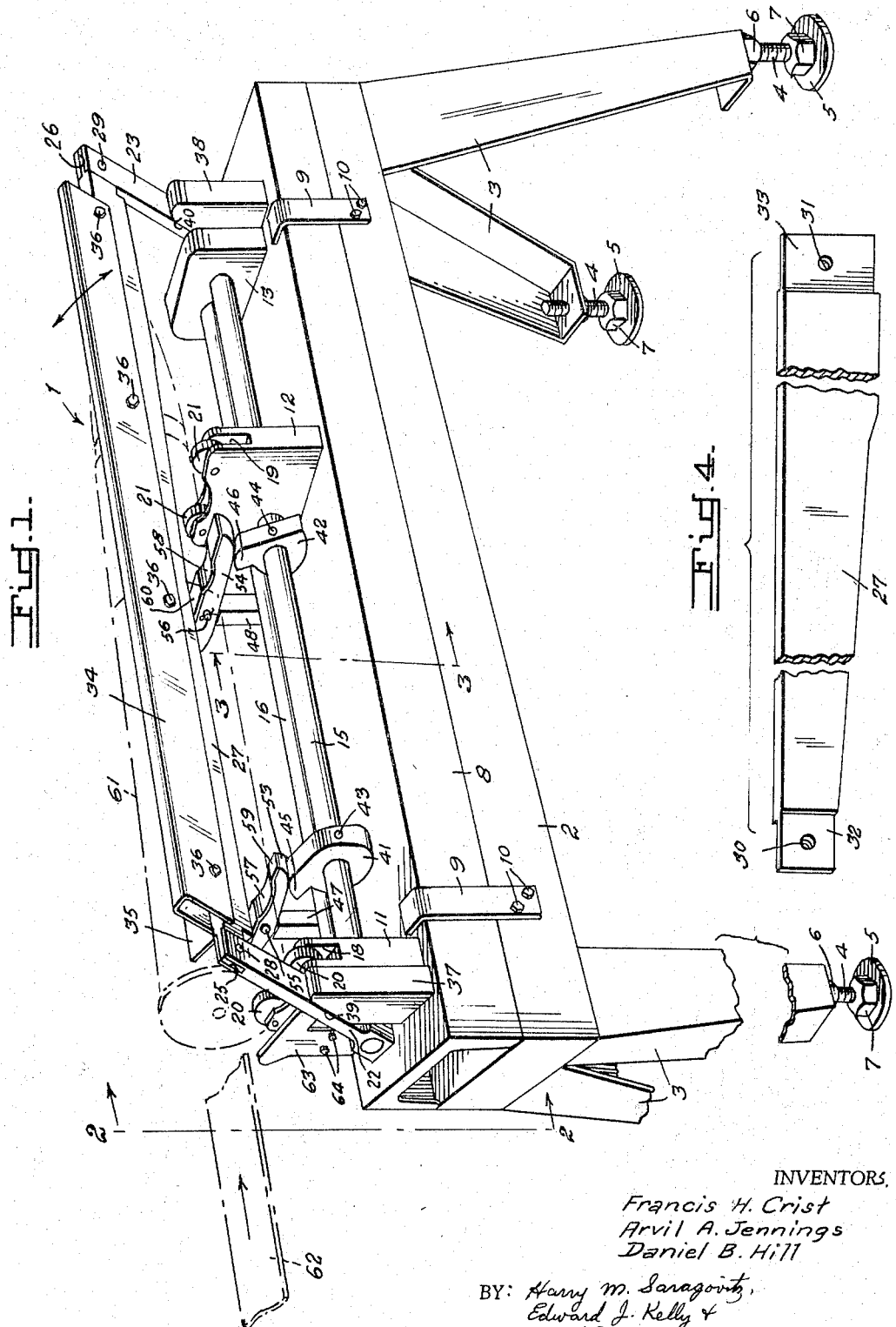

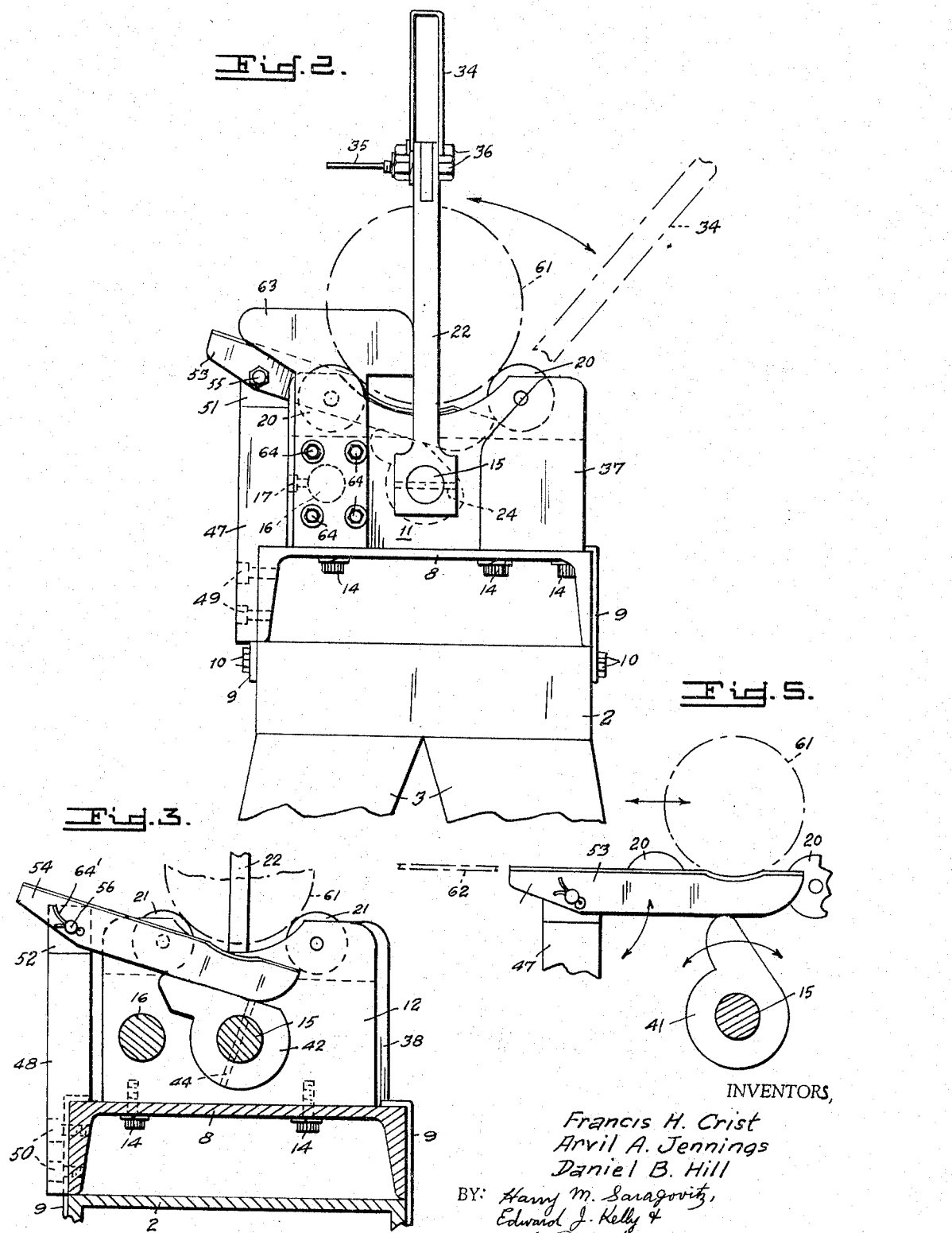

3,323,220
PROFILE AND ALIGNMENT GAGE
Francis H. Crist, Arvil A. Jennings, and Daniel B. Hill, Tooele, Utah, assignors to the United States of America as represented by the Secretary of the Army
Filed Aug. 3, 1965, Ser. No. 477,043
6 Claims. (Cl. 33—174)

The invention described herein may be manufactured and used by or for the Government for governmental purposes, without the payment to us of any royalty thereon.

This invention relates to a profile and alignment gage and more particularly to a gage for detecting errors in concentricity, diameter and profile occurring in artillery ammunition rounds.

Present profile and alignment gages are manufactured in tubular form and are precisely machined individually to a configuration of a breech relative to the applicable weapon. The breech, or chmber has a "go, no-go" sliding gate to provide entrance of the round and to check profile and alignment. Rejected rounds require a power source for removal. The rejected area is not known since the round is enclosed in the chamber. The gage is further affected by a safety requirement whereas a special holder and insertion method are required to prevent accident.

The overall weight of the aforesaid gage required material handling equipment to obtain mobility and the manufacturing specifications required internal grinding and other critical expenses resulting in excessive cost and maintenance.

The present invention is designed to simplify the gaging process and afford a lighter, economical and more mobile gaging means.

Briefly, the invention consists of a cradling apparatus in which an artillery round to be inspected is cradled into the inspection position by a pair of saddles. A gage bar is rotated into a vertical position and into contact with the rounds outer surface and in axial alignment therewith. The round is then rotated 360° and the defects in configuration detected visually.

It is therefore a primary object of this invention to provide a profile and alignment gage for manually detecting defects in concentricity, diameter or profile in artillery rounds.

It is another object to provide a gage consisting of a cradling apparatus for positioning an artillary round in alignment with a profile gage bar which is rotated to contact the outer surface of the round and the round is rotated 360° whereby existing defects thereof may be readily and visually observed.

A further object is the provision of a gage in which an artillery round is positioned and gaged by a single manually operated gage bar.

A final object is the provision of a profile and alignment gage which is economical in construction and having greater mobility.

These and other objects and advantages of the present invention will be fully apparent from the following description when take in connection with the annexed drawings, in which:

FIG. 1 is a perspective view of the profile and alignment gage of the invention, an artillery round being shown in broken lines and being cradled in position for gaging by the gage bar;

FIG. 2 is an end view looking in the direction as indicated on FIG. 1 by line 2—2;

FIG. 3 is a cross section view taken along line 3—3 of FIG. 1;

FIG. 4 is a broken perspective view of the gage bar; and,

FIG. 5 is a schematic view showing a round in one of the saddles and before being lowered onto the rollers.

Referring more specifically to the drawings and to FIG. 1 thereof, reference character 1 indicates generally the profile and alignment gage of the invention.

Gage 1 is supported on a table 2 having legs 3.

Means for leveling table 2 are provided and comprises adjusting screws 4 which are threadable in a nut 6 welded to the bottom of each leg. Floor engaging members are provided and consists of a nut 7 and a floor engaging disc 5, both of which are welded to screws 4.

A bed 8 provides a means for supporting the operating elements of gage 1 and, as shown, is an inverted channel member detachably secured on table 2 by angular straps 9 which are bolted to table 2 by bolts 10.

Secured on the top side of bed 8 are three, spaced journal blocks 11, 12 and 13. These blocks may be secured thereon by bolts 14, or by welding, and are spaced along the longitudinal axis of the gage 1.

Blocks 11, 12 and 13 serve as journals for a rotatable shaft 15. A second shaft 16 is carried by blocks 11, 12 and 13 and this shaft is fixed against rotation by set screws 17 (one being shown in FIG. 2). Shaft 16 serves only to brace blocks 11, 12 and 13.

Blocks 11 and 12 are channeled at their upper ends as at 18 and 19 in order to accommodate two pairs of trasversely spaced rollers 20 and 21 respectively.

Shaft 15 extends beyond blocks 11 and 13 and arms 22 and 23 are fixed on each end thereof by a pin 24 (one only being shown in FIG. 2).

Arms 22 and 23 are channeled at their upper ends, as at 25 and 26 respectively, and receive the ends of a gage bar 27. Gage bar 27 is contoured along its lower edge to conform to the particular artillery round to be gaged (see FIG. 4). Gage bar 27 is secured in channels 25 and 26 by pins 28 and 29 which pass through arms 22 and 23 through holes 30 and 31 in reduced portions 32 and 33 in the ends of gage bar 27.

A handle 34 is provided to operate gage bar 27 and comprises an elongated, inverted U-shaped member having a flange 35 integral with the lower inner end thereof. Handle 34 is secured over the upper portion of gage bar 27 by bolts 36.

Upright stops 37 and 38, each having an inner beveled portion 39 and 40 are secured on the upper side of bed 8 and disposed, one each, directly in transverse alignment under arms 22 and 23 and serve as rests for the arms.

A pair of longitudinally spaced cams 41 and 42 are mounted on shaft 15 by pins 43 and 44. Each cam has inwardly extending rounded nose portions 45 and 46.

A pair of upright standards 47 and 48 are mounted on the loading and unloading side of bed 8, opposite cams 41 and 42 by bolts 49 and 50.

Standards 47 and 48 are provided with reduced upper ends 51 and 52 and receive positioning saddles 53 and 54 which are pivoted thereon by pins 55 and 56.

Saddles 53 and 54 have axially aligned concave portions 57 and 58 in their upper surfaces to fit a particular caliber round to be supported thereon, and the upper surface of each saddle is coated with a neoprene cement as at 59 and 60.

A round to be gaged is indicated at 61 and is shown in broken lines. Also, schematically show in broken lines, is a portion of a belt conveyor 62.

An end stop 63 may be provided for longitudinally positioning the round 61 to be gaged and is secured on the outer end of block 11.

The operation of the gage 1 is extremely simple. A round 61 is rolled off the conveyor belt 62 and onto positioning saddles 53 and 54 and into the concave portions 47 and 58. Its position with respect to the gaging bar 27 is determined by end stop 63 when the head of round 61 abuts it.

Now the operator pushes the handle 34 forward which moves arms 22 and 23 vertically to rotate shaft 15 and cams 41 and 42. The nose portions 45 and 46 move downwardly to permit positioning saddles 53 and 54 to rotate downwardly. This action lowers around 61 onto rollers 20 and 21.

At this point, gaging bar 27 has been moved into contact with the outer surface of the round 61.

Next, the round 61 is rotated manually 360°. As long as the round 61 rotates freely and there is no movement of the gaging bar 27, the round is good. If there are any irregularities in its profile, concentricity, etc., rotation of the round 61 would become difficult and the round is therefore rejected.

By moving handle 34 backwards the round 61 is lifted off rollers 20 and 21 and the round is then rolled off onto the conveyor 62.

The gaging bar 27 is contoured for the particular round to be gaged and may be changed for measuring other rounds having a different caliber.

While the gage 1 has been illustrated and described for use in gaging artillery rounds, it may be used to gage other articles that are cylindrical in shape, such as pipes, shafts, etc.

A single operator can manipulate the gage 1.

The length of the article to be gaged is not critical, since only the bar 27 need be changed. The cams 41 and 42 and upright standards 47 and 48 could be moved closer together also as is expedient.

While the gage 1 and its bed 8 are shown secured on a table 2, the bed could be removed by removing angle straps 9 and the gage 1 could then be used independently thereof, and become, then, highly mobile.

The positioning saddles 53 and 54 can be quickly substituted for other saddles to fit other articles by removing a cotter pin 64' from pin 56, or pin 55.

Instead of using bolts to secure the stationary elements, the stationary elements could be welded and a permanent gage would be made which could be used for a repetitive gaging operation of rounds of the same caliber.

It is apparent from the foregoing description that a gage has been devised that is simple of construction and operable with a minimum number of manual operations.

While only a preferred form of the invention has been shown and described, other forms of the invention are contemplated and numerous changes and modifications may be made therein without departing from the spirit of the invention as set forth in the appended claims.

What is claimed is:

1. A profile and alignment gage comprising in combination, an elongated bed, a rotatable camming means mounted on said bed, a handle connected to said camming means, a series of longitudinally spaced, transversely opposed rollers mounted on said bed; an artillery round cradling means pivotally mounted on said bed and resting on said camming means and a longitudinally disposed gage bar carried by said handle, said handle when rotated to a vertical position adapted to rotate said camming means to lower said cradling means to permit an artillery round, when supported thereon, to rest on said rollers and whereby said round may be rotated 360° with respect to said gage bar to detect profile and axial alignment irregularities existing in the round.

2. A profile and alignment gage as set forth in claim 1 wherein said camming means comprise a series of spaced blocks mounted transversely on the top side of said bed, a shaft journaled to rotation in said blocks and a pair of spaced cams mounted for rotation with said shaft, said cams having rounded nose portions extending inwardly therefrom.

3. A profile and alignment gage as set forth in claim 1 wherein said cradling means comprises a pair of upright standards secured to a side of said bed and a pair of positioning saddles pivoted, one each, to the upper side of each standard, each saddle having a concave portion formed in its upper side and its free end adapted to rest on said camming means.

4. A profile and alignment gage as set forth in claim 1 wherein said gage bar comprises an elongated member having its under edge contoured to correspond to the contour of the profile of an artillery round to be gaged.

5. A profile and alignment gage for artillery rounds comprising, an elongated bed, a longitudinally disposed shaft mounted for rotation on said bed, a series of longitudinally spaced rollers mounted in transverse arrangement on said bed, cradling elements for an artillery round pivotally mounted on said bed, camming elements rotatable with said shaft and disposed under said cradling elements, a handle connected to said shaft and an elongated gage bar carried by said handle and disposed in axial alignment with an artillery round when supported by said cradling elements, whereby when said handle is moved to a vertical position, said camming elemnts will lower an artillery round supported thereon onto said rollers and said gaging bar will abut said artillery round and whereby when said round is rotated 360° profile and alignment irregularities thereon may be detected by said gage bar visually.

6. A profile and alignment gage for artillery rounds comprising a bed, a rotatable shaft mounted on said bed, a pair of spaced cams mounted for rotation with said shaft, a pair of round supporting elements pivotally mounted on said bed and disposed, one each, over said cams, a series of longitudinally spaced and transversely disposed parallel arrangement with the longitudinal axis of said cams, a handle connected at each of its ends to said shaft and a gage bar carried by said handle and disposed in parallel arrangement with the longitudinl axis of said gage whereby when said handle is rotated to a vertical position a round supported by said supporting elements is lowered onto said rollers and said gage bar is in contact with the round and said round may be rotated 360° with respect to said gage bar to detect profile and alignment irregularities therein.

References Cited
UNITED STATES PATENTS

| | | | |
|---|---|---|---|
| 2,322,954 | 6/1943 | Pembroke | 33—174 |
| 2,470,404 | 5/1949 | Kloos | 33—174 |

LEONARD FORMAN, *Primary Examiner.*

S. S. MATTHEWS, *Assistant Examiner.*